US012475057B2

(12) United States Patent
Bryant

(10) Patent No.: US 12,475,057 B2
(45) Date of Patent: *Nov. 18, 2025

(54) PIPELINED OUT OF ORDER PAGE MISS HANDLER

(71) Applicant: Intel Corporation, Santa Clara, CA (US)

(72) Inventor: Christopher D. Bryant, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,164

(22) Filed: Oct. 25, 2023

(65) Prior Publication Data

US 2024/0054077 A1 Feb. 15, 2024

Related U.S. Application Data

(63) Continuation of application No. 16/914,324, filed on Jun. 27, 2020, now Pat. No. 11,822,486.

(51) Int. Cl.
*G06F 12/1009* (2016.01)
(52) U.S. Cl.
CPC .... *G06F 12/1009* (2013.01); *G06F 2212/651* (2013.01)
(58) Field of Classification Search
CPC .............. G06F 12/1009; G06F 2212/651
See application file for complete search history.

(56) References Cited

U.S. PATENT DOCUMENTS

2014/0075123 A1  3/2014 Hildesheim et al.
2015/0121046 A1  4/2015 Kunjan et al.

OTHER PUBLICATIONS

Intel, "5-Level Paging and 5-Level EPT", White Paper, Revision 1.1, Document No. 335252-002, May 2017, 31 Pages.
Intel, "TLBs, Paging-Structure Caches, and Their Invalidation", Application Note, Document No. 317080-003, Apr. 2007, pp. 1-34.
Notice of Allowance, U.S. Appl. No. 16/914,324, Jul. 26, 2023, 10 pages.

*Primary Examiner* — Chie Yew
(74) *Attorney, Agent, or Firm* — NICHOLSON DE VOS WEBSTER & ELLIOTT LLP

(57) ABSTRACT

Systems, methods, and apparatuses relating to circuitry to implement a pipelined out of order page miss handler are described. In one embodiment, a hardware processor core includes an execution circuit to generate data storage requests for virtual addresses, a translation lookaside buffer to translate the virtual addresses to physical addresses, and a single page miss handler circuit comprising a plurality of pipelined page walk stages, wherein the single page miss handler circuit is to contemporaneously perform a first page walk within a first stage of the plurality of pipelined page walk stages for a first miss of a first virtual address in the translation lookaside buffer, and a second page walk within a second stage of the plurality of pipelined page walk stages for a second miss of a second virtual address in the translation lookaside buffer.

20 Claims, 16 Drawing Sheets

| ST4/DC5 602 | PM1 604 | PM2 606 | PM3/SCH 608 | PM4/IS0 610 | PM5/IS1 612 | D0 614 | D1 616 | D2 618 | D3 620 | D4/PM1 622 | PM2 624 |
|---|---|---|---|---|---|---|---|---|---|---|---|
| TLB MISS (Entry Loaded) | PMH Pipeline Req, Read PDx Caches | Check Contents of PDx Caches | Request DCU Pipeline, Check cumulative Faults | Check Terminal Faults | Update Queue entries, fault information | Staging | DCTAG Read | DCDATA Read (e.g., hit in L1 cache) | Data Return | PMH Pipeline Req | Staging/ Write PDx Caches |
| | | | | | Change State 626 | | | | Update Entry 628 | | |
| | | | START_STATE | | | | | | PL4_STATE | | |

```
┌─────────────────────────────────────────────────────────────────────────┐
│  TRANSLATING VIRTUAL ADDRESSES TO PHYSICAL ADDRESSES WITH A TRANSLATION │
│                   LOOKASIDE BUFFER OF A SYSTEM                          │
│                              802                                        │
└─────────────────────────────────────────────────────────────────────────┘
                                    │
                                    ▼
┌─────────────────────────────────────────────────────────────────────────┐
│   PERFORMING A FIRST PAGE WALK WITHIN A FIRST STAGE OF A PLURALITY OF   │
│  PIPELINED PAGE WALK STAGES OF A SINGLE PAGE MISS HANDLER CIRCUIT OF THE│
│   SYSTEM FOR A FIRST MISS OF A FIRST VIRTUAL ADDRESS IN THE TRANSLATION │
│                          LOOKASIDE BUFFER                               │
│                                804                                      │
└─────────────────────────────────────────────────────────────────────────┘
                                    │
                                    ▼
┌─────────────────────────────────────────────────────────────────────────┐
│  CONTEMPORANEOUSLY PERFORMING A SECOND PAGE WALK WITHIN A SECOND        │
│  STAGE OF THE PLURALITY OF PIPELINED PAGE WALK STAGES OF THE SINGLE PAGE│
│  MISS HANDLER CIRCUIT FOR A SECOND MISS OF A SECOND VIRTUAL ADDRESS IN  │
│                    THE TRANSLATION LOOKASIDE BUFFER                     │
│                                806                                      │
└─────────────────────────────────────────────────────────────────────────┘
```

FIG. 8

PIPELINED OUT OF ORDER PAGE MISS HANDLER

CROSS-REFERENCE TO RELATED APPLICATIONS

The present application is a continuation application claiming priority from U.S. patent application Ser. No. 16/914,324 filed Jun. 27, 2020, which is incorporated herein by reference in its entirety.

TECHNICAL FIELD

The disclosure relates generally to electronics, and, more specifically, an embodiment of the disclosure relates to circuitry to implement a pipelined out of order page miss handler.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6 illustrates example page walk and data access stages for a pipelined page miss handler according to embodiments of the disclosure.

FIG. 8 illustrates a flow diagram for pipelined page miss handling according to embodiments of the disclosure.

DETAILED DESCRIPTION

Figure 1:
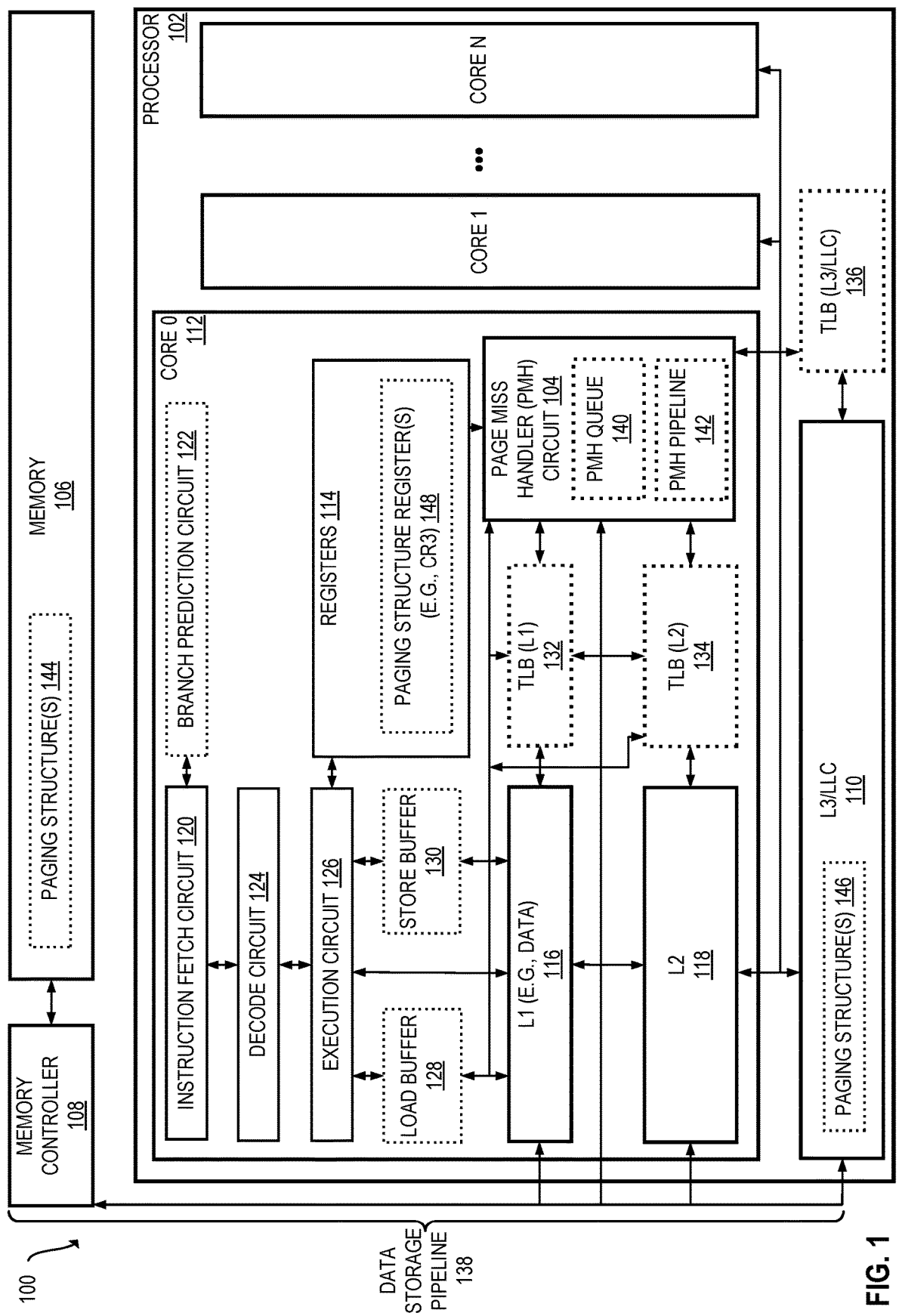
FIG. 1 illustrates a hardware processor, including a page miss handler circuit, coupled to a memory according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. A hardware processor may access data in data storage (e.g., memory). In one embodiment, a computer includes a hardware processor requesting access to (e.g., load or store) data and the data storage is local to the computer (e.g., within the processor or separate). Memory may be divided into separate blocks (e.g., one or more cache lines) of data that may be managed as a unit for coherence purposes. In certain embodiments, a (e.g., data) pointer (e.g., an address) is a value that refers to (e.g., points to) the location of data, for example, a pointer may be an (e.g., linear) address and that data may be stored at that (e.g., linear) address. In certain embodiments, memory is divided into multiple lines and each line has its own (unique) address. For example, a line of memory may include storage for 512 bits, 256 bits, 128 bits, 64 bits, 32 bits, 16 bits, or 8 bits of data. An address may be a virtual (or linear) address or a physical address. A processor may convert a virtual (or linear) address (e.g., as seen by a program running on the processor) to a physical address (e.g., the address in memory hardware). Certain embodiments use segmented (non-linear) virtual addressing, as opposed to linear addressing. In one embodiment, linear address are determined from virtual address by segment translation. In certain embodiments, segmented addressing means that memory (physical and virtual memory) is divided into certain sized (e.g., 64K) blocks, for example, where this is the maximum value for the Instruction Pointer (IP) register. In one embodiment, the virtual address (e.g., offset) with the value from a segment (e.g., CS, DS, SS, ES, etc.) register to determine the memory location from where the system (e.g., processor) should access the data for that virtual address.

In certain embodiments, a translation lookaside buffer (e.g., TLB) converts a virtual (or linear) address to a physical address (e.g., of the system memory). A TLB may include a data table to store (e.g., recently used) virtual (or linear)-to-physical (memory) address translations, e.g., such that the translation does not have to be performed on each virtual (or linear) address present to obtain the physical (memory) address. In certain embodiments when the virtual (or linear) address entry is not in the TLB, a processor (e.g., page miss handler thereof) performs a page walk to determine the virtual-to-physical (memory) address translation. The physical address for that mapping may then be inserted into an entry of the TLB (e.g., and the request memory access performed at that physical address corresponding to the virtual address).

Certain processors (e.g., processor core) may only service a single page walk one at a time. Certain processors (e.g., processor core) may have a number of multiple page miss handlers to perform that number of walks contemporaneously (e.g., two separate page miss handlers to perform two walks contemporaneously)). However, this increases the area and power utilized by the page miss handlers. Replication of the page miss handler hardware may also utilize logic circuitry that suspends/interrupts a walk, and there is latency associated with stopping and starting a page walk.

Embodiments herein are directed to a single page miss handler circuit having a plurality of pipeline walk stages that allow for a plurality of contemporaneous page walks to be performed, e.g., allowing "N" (where N is a positive integer greater than one) number of walks contemporaneously without replication of the hardware "N" number of times. Using a single page miss handler circuit saves area and power utilization for page walking. Embodiments herein track (e.g., via a state machine) a current state of a plurality of possible states for each page walk, e.g., for a plurality of pipelined page walk stages and/or data access stages. In one embodiment, multiple (e.g., each) state of a page miss handler (PMH) state machine is completely independent of the other states, e.g., at any given time the page miss handler can have multiple walks in different or the same states at the same time. The term "contemporaneous" may generally refer to originating, existing, or happening during a same period of time.

Turning now to FIG. 1, an example core architecture is depicted. FIG. 1 illustrates a hardware processor 102, including a page miss handler circuit 104, coupled to a memory 106 according to embodiments of the disclosure. In one embodiment, the memory 106 of system 100 is a system memory (e.g., dynamic random-access memory (DRAM)). Memory controller 108 may be included, e.g., to manage memory requests between the processor 102 and memory 106. In one embodiment, memory controller 108 is to provide (e.g., fill) data (e.g., a cache line) for a miss in the cache(s) (e.g., miss in L3 or other last level cache (LLC) 110 of processor 102). Processor 102 may include one or more processor cores, e.g., 0 to N where N is a positive integer. In one embodiment, each of a plurality of processor cores have an instance of the circuitry, etc. depicted and/or discussed in reference to core 112 in FIG. 1.

Depicted core 112 includes a set of registers 114, a first level cache (level one (L1)) 116 (e.g., data cache (Dcache), and a level two (L2) or mid-level cache (MLC) 118. In some embodiments, as shown in FIG. 1, a processor 102 includes a next level (e.g., level three (L3) cache or last level cache (LLC) 110 (e.g., the last cache searched before a data item is fetched from memory 106) that is coupled to, and shared by, one or more (e.g., all) of the cores. In certain embodiments, each of L1 116, L2/MLC 118, and L3/LLC 110 caches are managed by cache controller circuitry thereof, e.g., to cache data (e.g., and/or instructions) according to a specified cache coherency. In certain embodiments, the data (e.g., and/or instructions) stored within the various processor caches are managed at the granularity of cache lines which may be a fixed size (e.g., 64, 128, 512, etc. Bytes in length). Core 112 further includes an instruction fetch circuit 120 for fetching instructions (for example, from (e.g., main) memory 106 via memory controller 106 and/or from the shared LLC 110; a decode circuit 124 (e.g., decoder or decode unit) for decoding the instructions (e.g., decoding program instructions into micro-operations or "µops"); and an execution unit 126 (e.g., execution circuit) for executing the decoded instructions. Core 112 may include a writeback/retire circuit for retiring the instructions and writing back the results, e.g., via using load buffer 128 to store data for pending load accesses and store buffer 130 to store data for pending store accesses. In one embodiment, a store buffer (e.g., store buffer 130) maintains (e.g., serializes) stores (e.g., storage requests which may also include the payload to be stored at a target cache line) in (e.g., program) order (and not the order of execution, which may be out-of-order) to ensure in (e.g., program) order updates to the memory (e.g., caches). In certain embodiments, a processor is placed in total store order (TSO) mode to enable use of the store buffer(s), etc. Store buffer may be a first in, first out buffer (FIFO), e.g., with the stores provided to the FIFO buffer in program order. In one embodiment, the TLB's are not tied to the data caches per se, for example, with load buffer 128 and/or store buffer 130 coupled to L1 TLB 132, L1 TLB 132 coupled to L2 TLB 134, and L2 TLB 134 (e.g., output thereof) coupled to load buffer 128 and/or store buffer 130.

Core 112 may include a branch prediction circuit 122, for example, to predict a taken branch and/or a not-taken branch, e.g., and cause a prefetch of the instruction(s) for the predicted-to-be-taken branch. The predictions may be correct, which allows high performance to be achieved by hiding the latency of the operations that determine the control flow and increasing the parallelism the processor can extract by having a larger pool of instructions to analyze. However, if a prediction is wrong, then the work that was executed speculatively is discarded and the processor will be redirected to execute down the correct instruction path in certain embodiments. In certain embodiments, a core is an instance of core 990 in FIG. 9B.

In certain embodiments, the L1 cache 116, L2 cache 118, Last Level cache 110 (and any other cache levels) form a hierarchy of data storage pipeline 138 (e.g., a memory execution cluster). In one embodiment, the data storage pipeline 138 includes memory 106 (e.g., memory separate from processor 102). In certain embodiments, data storage pipeline 138 (e.g., L1 cache 116 thereof) receives a request to perform a data (e.g., "memory") access (e.g., a store or load) at a virtual address, for example, from execution unit 126. In one embodiment, the linear address for that data access request is searched in the one or more TLBs of the processor 102 (e.g., of core 112 for a request originating from core 112). A single (or multiple) translation lookaside buffer may be utilized to provide virtual to physical address translations (e.g., without performing a page walk). A distributed TLB hierarchy may include a TLB 132 for L1 cache 116, a TLB 134 for L2 cache 118, and/or a TLB 136 for LLC/L3 cache 110. Another example is a cascaded TLB hierarchy where a lookup in L1 TLB is followed by L2 TLB followed by L3 TLB, etc., for example, where each TLB is increasingly larger in storage size (e.g., without regard to data cache levels).

When there is a hit for a TLB(s) (e.g., there is an active mapping for that input virtual address), certain embodiments herein utilize the physical address for that mapping to the virtual address to access the data at that physical address.

When there is a miss for a TLB(s) (e.g., there is no active mapping for that input virtual address), certain embodiments herein cause a page walk to be performed by page miss handler circuit 104. However, in certain embodiments, a page walk is time-consuming when compared to the processor (e.g., core) execution speed as it involves reading the contents of multiple data storage (e.g., cache and/or memory 106) locations and using them to compute the physical address for that virtual address. Embodiments herein utilize a page miss handler circuit having a plurality of pipeline walk stages (e.g., and corresponding states in a state machine) that allow for a plurality of contemporaneous page walk stages to be performed. For example, page miss handler circuit 104 in FIG. 1 may include a page miss handler (PMH) queue 140 and/or page miss handler (PMH) pipeline 142. Page miss handler (PMH) queue 140 may include an entry for each miss. In certain embodiments, each entry in queue 140 includes a (e.g., retire) pointer (e.g., an instruction pointer for an instruction that caused the data access request). Each entry in queue 140 may include comparators for other incoming misses that match the entry. In certain embodiments, page miss handler circuit 104 is to individually manage each stage of page miss handler (PMH) pipeline 142, for example, such that multiple different page walks (e.g., different stages thereof) for different data access requests (e.g., different instructions) are being serviced at the same time. In certain embodiments, each stage of a plurality of page walks may be handled out of order, for example, with a stage of a first (based on program order or order of receipt by the queue 140) page walk being performed concurrently with a different stage of a (earlier or later) second (based on program order or order of receipt by the queue 140) page walk being performed.

In one embodiment, a request to perform an action (e.g., to perform a level of a multiple level, page miss walk) is sent to the servicing component (e.g., of page miss handler (PMH) pipeline 142 and/or data storage pipeline 138) on the completion of another action, for example, at the beginning of a new time period (e.g., a cycle of the page miss handler circuit 104 and/or core). Page miss handler circuit 104 (e.g., page miss handler (PMH) pipeline 142 thereof) may utilize one or more paging structures. A multiple-level page miss handler pipeline may use a different paging structure (e.g., table) for each level. Paging structure(s) may be stored in memory (e.g., paging structure(s) 144 in memory 106) or in the cache hierarchy (e.g., paging structure(s) 146 in LLC 110). Paging structure(s) may be stored in one or more levels of data-cache hierarchy (e.g., L1 cache 116, L2 cache 118, L3/LLC 110, etc.). A paging structure may be a page table in certain embodiments. An example of page tables utilized with a four-level page miss handler pipeline are discussed below in reference to FIG. 4. An example of page tables utilized with a five-level page miss handler pipeline are discussed below in reference to FIG. 5.

In certain embodiments, a (e.g., logical) processor (e.g., core) uses paging if and only if a paging (PG) bit (e.g., bit 31) is set to 1 in a control register (e.g., CR0 register) (e.g., of registers 114). In certain embodiments, a processor applies paging to all memory accesses that use virtual (or linear) addresses, for example, including instruction fetches and data accesses. Paging may also apply to prefetches and to memory accesses that are a result of speculative execution that may never actually occur in the executed code path (e.g., with such accesses not, however, causing page faults). Certain embodiments of processors support different paging modes (e.g., for different page miss handler pipelines). For example, paging in a four-level mode for a four-level hierarchy of paging structures or paging in a five-level mode for a five-level hierarchy of paging structures. In one embodiment, if one or more register bits are set (e.g., IA32_EFER.LMA=1 and CR4.LA57=0), four-level paging is used. In one embodiment, if one or more register bits are set (e.g., IA32_EFER.LMA=1 and CR4.LA57=1), five-level paging is used. In certain embodiments, a page miss handler uses a register (e.g., paging structure register 148 (e.g., CR3 register) of registers 114) to locate the first paging-structure in the paging structure hierarchy. The paging structures may be stored in one or more levels of cache and/or memory. For example, a processor may support any or all of the following examples of paging structure caches:

PML4(or 5) cache. in certain embodiments, each page miss level (PML)-cache entry is referenced by a (e.g., 9-bit) value and is used for linear addresses for which bits (e.g., 47:39) have that value. In certain embodiments, the entry contains information from the PML4 entry used to translate such linear addresses:
Page-directory-pointer table address. The physical address from the PML4 entry.
Read/write. The value of the read/write bit of the PML4 entry.
User/supervisor. The value of the user/supervisor bit of the PML4 entry.
Execute-disable. The value of the execute-disable bit of the PML4 entry.
The following details how a processor may use the PML4 cache:
If a PML4-cache entry is used for a linear address, the processor may use that entry to locate the translation's page-directory-pointer table and the bits used to control accesses with that linear address. The processor might not use the PML4 entry in memory.
The processor does not create a PML4-cache entry unless the present bit is 1 in the PML4 entry in memory.
The processor does not create a PML4-cache entry unless the accessed bit is 1 in the PML4 entry in memory; before caching a translation, the processor will set the accessed bit if it is not already 1.
The processor may create a PML4-cache entry even if there are no translations for any linear address that might use that entry (e.g., because all entries in the referenced page-directory-pointer table are marked "not present").

The processor may create a PML4-cache entry at the time of translation, and the information in the entry is determined at that time. The entry may not reflect any subsequent modifications to the PML4 entry in memory.

PDP cache. In certain embodiments, each PDP-cache entry is referenced by a (e.g., 18-bit) value and is used for linear addresses for which bits (e.g., 47:30) have that value. The entry contains information from the PML4 entry and PDP used to translate such linear addresses:

Page-directory address. The physical address from the PDP.

Read/write. The logical-AND of the read/write bits in the PML4 entry and PDP.

User/supervisor. The logical-AND of the user/supervisor bits in the PML4 and PDP.

Execute-disable. The logical-OR of the execute-disable bits in the PML4 entry and PDP.

The following details how a processor may use the PDP cache:

If a PDP-cache entry is used for a linear address, the processor may use that entry to locate the translation's page directory and the bits used to control accesses with that linear address. The processor might not use the PML4 entry or PDP in memory.

The processor does not create a PDP-cache entry unless the present bits are 1 in the PML4 entry and PDP in memory.

The processor does not create a PDP-cache entry unless the accessed bits are 1 in the PML4 entry and PDP in memory; before caching a translation, the processor will set any accessed bits that are not already 1.

The processor may create a PDP-cache entry even if there are no translations for any linear address that might use that entry (e.g., because all entries in the referenced page directory are marked "not present").

The processor may create a PDP-cache entry at the time of translation, and the information in the entry is determined at that time. The entry may not reflect any subsequent modifications to the PML4 entry and PDP in memory.

PDE cache. In certain embodiments, each PDE-cache entry is referenced by a (e.g., 27-bit) value and is used for linear addresses for which bits (e.g., 47:21) have that value. The entry contains information from the PML4 entry, PDP, and PDE used to translate such linear addresses:

Page-table address. The physical address from the PDE.

Read/write. The logical-AND of the read/write bits in the PML4 entry, PDP, and PDE.

User/supervisor. The logical-AND of the user/supervisor bits in the PML4 entry, PDP, and PDE.

Execute-disable. The logical-OR of the execute-disable bits in the PML4 entry, PDP, and PDE.

The following items detail how a processor may use the PDE cache:

If a PDE-cache entry is used for a linear address, the processor may use that entry to locate the translation's page table and the bits used to control accesses with that linear address. The processor might not use the PML4 entry, PDP, and PDE in memory.

The processor does not create a PDE-cache entry unless the present bits are 1 in the PML4 entry, PDP, and PDE in memory.

The processor does not create a PDE-cache entry unless the accessed bits are 1 in the PML4 entry, PDP, and PDE in memory; before caching a translation, the processor will set any accessed bits that are not already 1.

The processor may create a PDE-cache entry even if there are no translations for any linear address that might use that entry (e.g., because all entries in the referenced page table are marked "not present").

The processor may create a PDE-cache entry at the time of translation, and the information in the entry is determined at that time. The entry may not reflect any subsequent modifications to the PML4 entry, PDP, and PDE in memory.

Note that information from a paging-structure entry may be included in entries in the paging-structure caches for other paging-structure entries referenced by the original entry. For example, if the read/write bit is 0 in a PML entry, then the read/write bit will be 0 in any PDP-cache entry for a PDP from the PDP table referenced by that PML entry. This is because the read/write bit of each such PDP-cache entry is the logical-AND of the read/write bits in the appropriate PML4 entry and PDP, and the former is 0 by assumption in certain embodiments.

Embodiments herein utilize a page miss handler (e.g., circuit or code) that performs a proper subset of the operations of a page walk, for example, and allows other page walks to perform non-conflicting operations of respective page walk(s). As an example, a first page walk may have finished a first pipelined page walk stage (e.g., as indicated by a first state) of determining a physical address of the root (e.g., first level) of the paging structure hierarchy used for that virtual address being "page walked". While waiting for the data to be read at that physical address, the first page walk may be placed in a waiting state (e.g., "idle") while a second page walk then utilizes the first pipelined page walk stage (e.g., the pipeline circuitry thereof) for a different virtual address being "page walked". A page miss handler may thus contemporaneously utilize a plurality of pipelined page walk stages and/or data access stages (e.g., with data storage pipeline 138) to perform (e.g., out-of-order) page walks. At the end of a page walk, an output of the page miss handler is a physical address for the input (virtual address) in certain embodiments.

In certain embodiments, once a physical address for a data access request is determined, it is input into the data storage pipeline 138 to access that data, e.g., with a hit occurring for a cache when it is determined that the cache includes a copy of the data for the physical address. In certain embodiments, one or more TLBs are updated with this virtual address to physical address mapping for the completed page walk.

A (e.g., hardware) processor may operate on data (e.g., a cache line of data), for example, in performing arithmetic or logic functions. A cache line may generally refer to a block (e.g., a sector) of memory (e.g., a cache) that may be managed as a unit for coherence purposes, for example, via cache tags maintained on a per-line basis, e.g., in a tag directory of a cache controller circuit. A cache line may be stored in cache memory (e.g., of any level, such as, but not limited to, L1, L2, L3, L4, etc.), system memory, or combinations thereof. Cache memory may be shared by multiple cores of a processor or local (e.g., not shared) to each core of a processor. Cache memory (e.g., a cache) may generally refer to a memory buffer inserted between one or more processors and other memory, for example, to store (e.g., hold) currently active copies of cache lines (e.g., blocks from system (main) memory). Cache memory may be local to each processor. Additionally, or alternatively, cache memory may be shared by multiple processors, e.g., separate from each processor. System memory may be separate from any cache memory, e.g., system memory that is off-die relative to a processor core. Processing elements that use (e.g., share) a cache may be processor cores of a data processor and/or graphic processors. Cache line may refer to a 64-byte sized section of memory, e.g., 64 byte granularity.

Cache line coherency may generally refer to each cache (e.g., cache memory) and/or system (e.g., main) memory in the coherence domain observing all modifications of that same cache line (e.g., that each instance of that cache line contains the same data). For example, a modification may be said to be observed by a cache when any subsequent read would return the newly (e.g., current) written value.

In one embodiment, cache line coherency logic (e.g., as part of a hardware apparatus or method) may be used to manage and/or resolve conflicts resulting from a number of transactions, for example, a cache line look-up, cache line eviction, cache line fill, and snoop transactions. A snoop may generally refer to the action taken by a module on a transaction when it is not the master that originated the transaction or the repository of last resort for the data, but it still monitors the transaction. A cache (e.g., cache memory) and/or system memory may be snooped to maintain coherence during transactions to a cache line appearing in multiple locations in the cache and/or system memory.

In one embodiment, a cache line look-up may involve read and/or read-for-ownership transactions from the processor cores accessing the cache and/or system memory to read or gain ownership of a desired cache line. If the cache line look-up results in a miss in the cache (e.g., cache local to a processor), the request may be allocated to the external request queue, e.g., corresponding to an interface with the system memory. If the cache line look-up results in a hit and the corresponding cache line is not exclusively owned by another core or processor, then the request may be completed and the cache line (e.g., data) returned to the requesting core. Accesses to a particular core from a requesting agent may be reduced by maintaining a tag (e.g., record) in a tag directory of whether another core has exclusive ownership, shared ownership, or no ownership of a requested line of the cache. The tag may be sets of bits in a tag directory (e.g., register) corresponding to the number of cores in a processor and/or processors, where each set of bits may indicate the type of ownership of the requested cache line, if any, for the core and/or processor to which it corresponds. However, the tag may be implemented in other ways without departing from the spirit of this disclosure.

In certain embodiments, a component of a system (e.g., a processor) is to first search into a cache (e.g., via the physical address) for a data access request (e.g., a read access to cause a read of data or a write access to cause a write of (e.g., payload) data) before using performing a more time consuming access into memory (e.g., system memory) separate from the cache.

Figure 2:
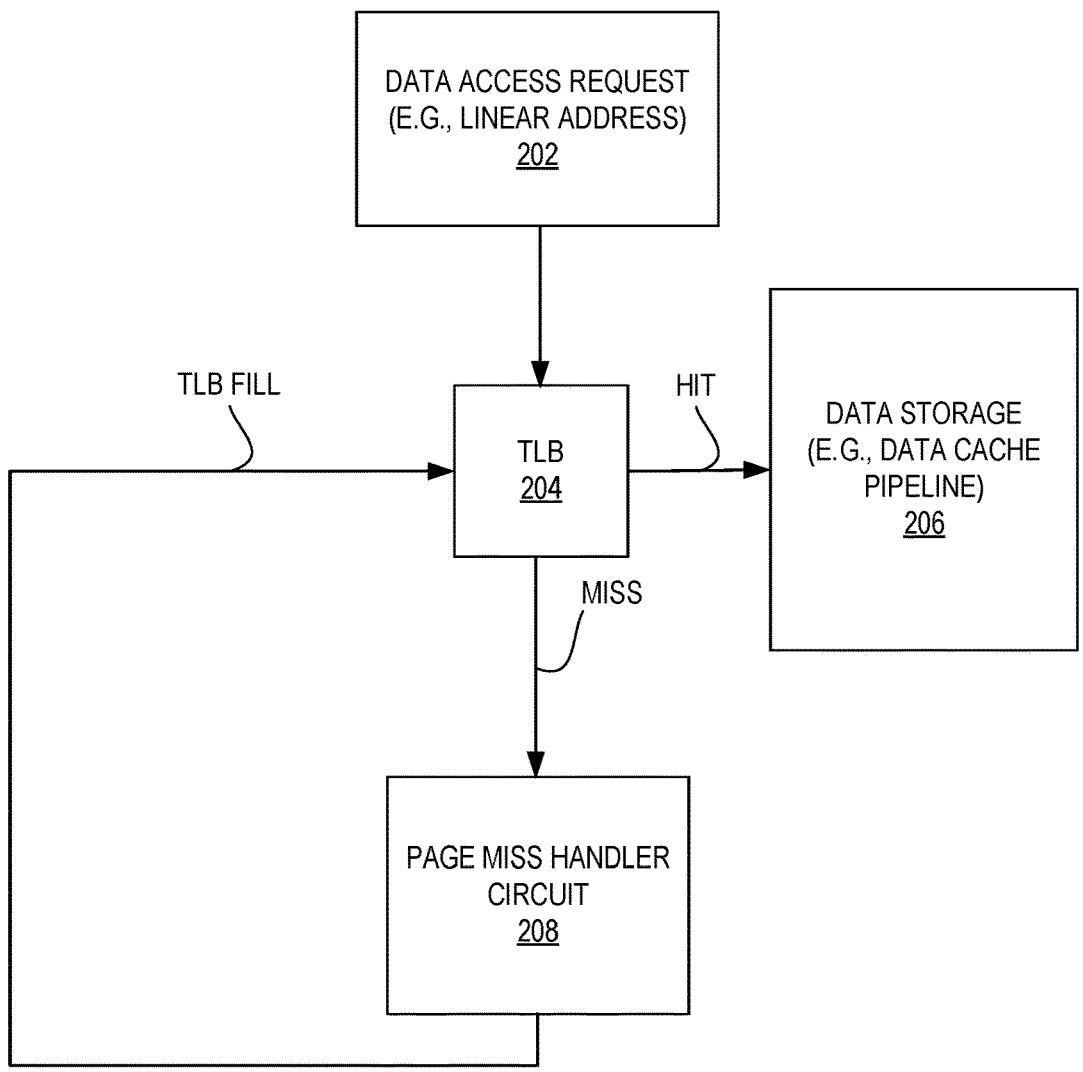
FIG. 2 illustrates a translation lookaside buffer (TLB) coupled to a page miss handler circuit and data storage according to embodiments of the disclosure.

FIG. 2 illustrates a translation lookaside buffer (TLB) 204 coupled to a page miss handler circuit 208 (e.g., an instance of page miss handler circuit 104 from FIG. 1) and data storage 206 (e.g., a data cache pipeline) according to embodiments of the disclosure. In certain embodiments, a data access request 202 is received (including an identifier of the virtual address) and a corresponding entry for that virtual address is searched. If the mapping is present (e.g., a hit), that physical address is used to perform the data access request 202 in data storage 206. If the mapping is not present (e.g., a miss), a page walk is performed by page miss handler circuit 208, e.g., according to the embodiments herein. The returned physical address for that virtual address may be inserted into TLB 204 as a TLB fill, e.g., where TLB 204 can be a TLB of any level or levels (e.g., L1 TLB, L2 TLB, L3 TLB, etc.).

Figure 3:
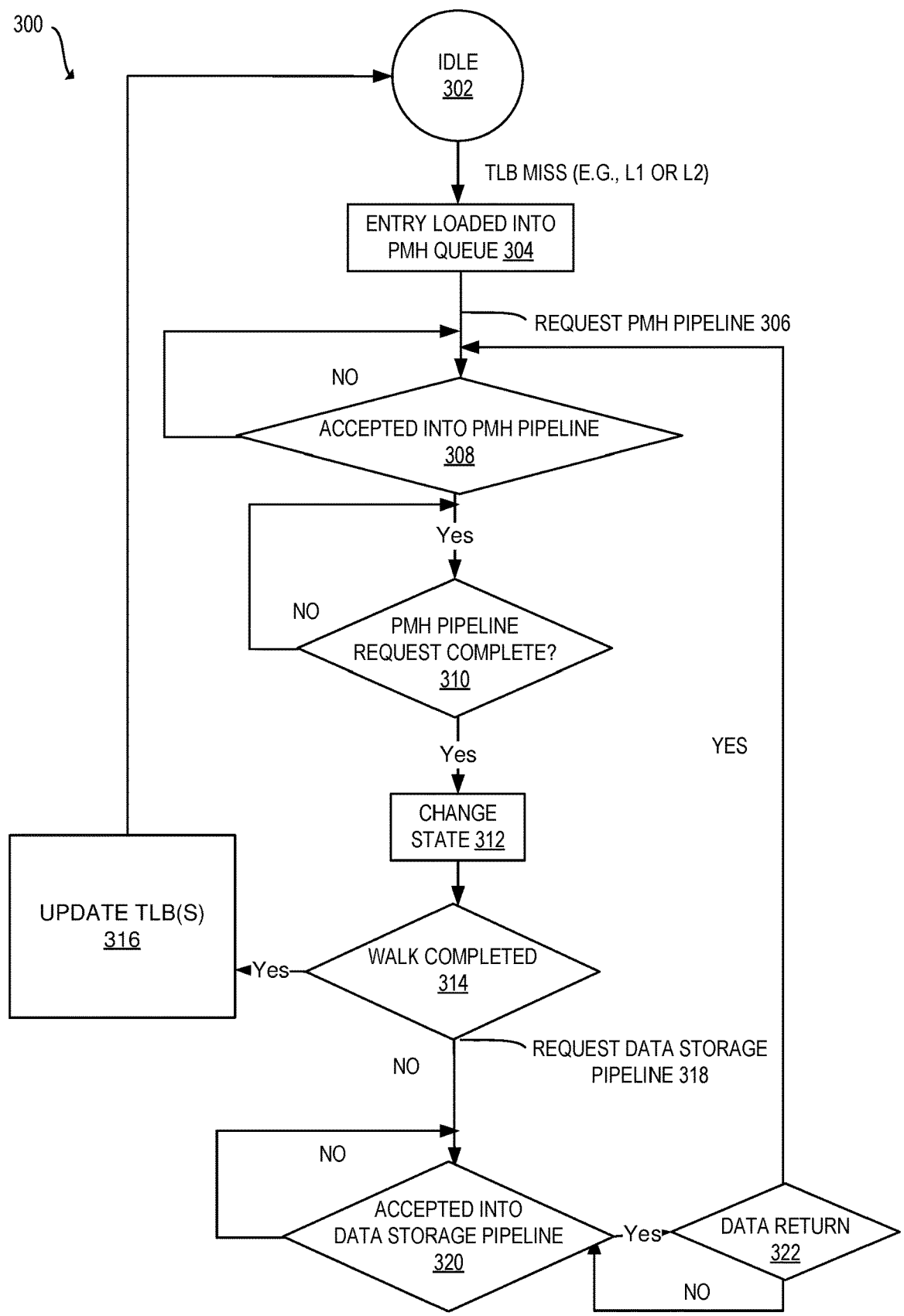
FIG. 3 illustrates an example flow for a pipelined out of order page miss handler for a TLB miss according to embodiments of the disclosure.

FIG. 3 illustrates an example flow 300 for a pipelined out of order page miss handler (e.g., page miss handler circuit 104 in FIG. 1) for a TLB miss according to embodiments of the disclosure. Flow 300 includes being idle at 302 and then receiving data for a TLB miss (e.g., an L1 or L2 TLB miss). In flow 300, an entry is loaded into a page miss handler queue at 304. Page miss handler queue may then attempt to (e.g., at certain time period(s)) launch a request from one or more of the page miss handler queue entries into a page miss handler (PMH) pipeline at 306. In certain embodiments, an entry is attempted to be accepted into the PMH pipeline at 308, and if no, it remains in the queue for an additional attempt(s) at being accepted into the PMH pipeline, and if yes (e.g., when a stage requested for that entry is now available), the request proceeds to the requested stage. In flow 300, it is checked if the PMH pipeline request is complete (e.g., has the data been returned by the PMH pipeline for that level of a multiple level page walk), if no, the request remains in process, and if yes, the state for that page walk (e.g., of a plurality of states of a single walk) is updated at 312. At 314, it is checked if the page walk is completed (e.g., is the data returned at 310 the physical address), and if yes, the output (e.g., physical address) is sent to update the TLB at 316 (e.g., via PMH circuit performing the write of the output or the output being sent to a load buffer or a store buffer for a load request or store request, respectively), and if no, the (e.g., intermediate) data returned (e.g., a physical address at 310 for a next level of a multiple paging structure) is then utilized in an request to access a data storage pipeline at 318. At 320, the request is attempted to be accepted into the data storage pipeline at 320, and if no, it remains in waiting for an additional attempt(s) at being accepted into the data storage pipeline, and if yes (e.g., when a stage of the data storage pipeline requested for that physical address is now available), the request proceeds to the requested physical address. At 322, the requested data (e.g., data for a load from a paging structure (e.g., table) is waited for, and once it arrives, that data is sent back into the PHM pipeline (e.g., with that data being updated into a corresponding entry in PMH queue). This process can be in flight for multiple entries, one entry in flight in PMH pipeline (e.g., and data storage pipeline) for each state (e.g., stage) of PMH pipeline (e.g., and data storage pipeline).

In one embodiment, a page miss handler utilizes an "N" deep (e.g., number of entries) page miss handler queue that upon a virtual address missing in a TLB (or TLBs), adds the request to the queue. In certain embodiments, upon addition to the queue, a request to the page miss handler state (e.g., a state within finite state machine 700 in FIG. 7) that is to be used is made. In certain embodiments, the PMH "state" that was requested will accept the request and return to "IDLE" to handle a different request. In certain embodiments, the queue entry that requested that state is updated, and performs the operation to request the next information of the walk. Upon getting the data for that request back, the queue entry will request the next state of the PMH in certain embodiments. While this queue entry is sending its operation or requesting the next state, another queue entry can be requesting a different PMH state or accessing the data storage (e.g., data cache) pipeline to get the next information for its current state in certain embodiments. In one embodiment, the queue entries hold the retire pointer of the original access, so the page miss handler processes the entries by an oldest (e.g., ready) scheduler.

Figure 4:
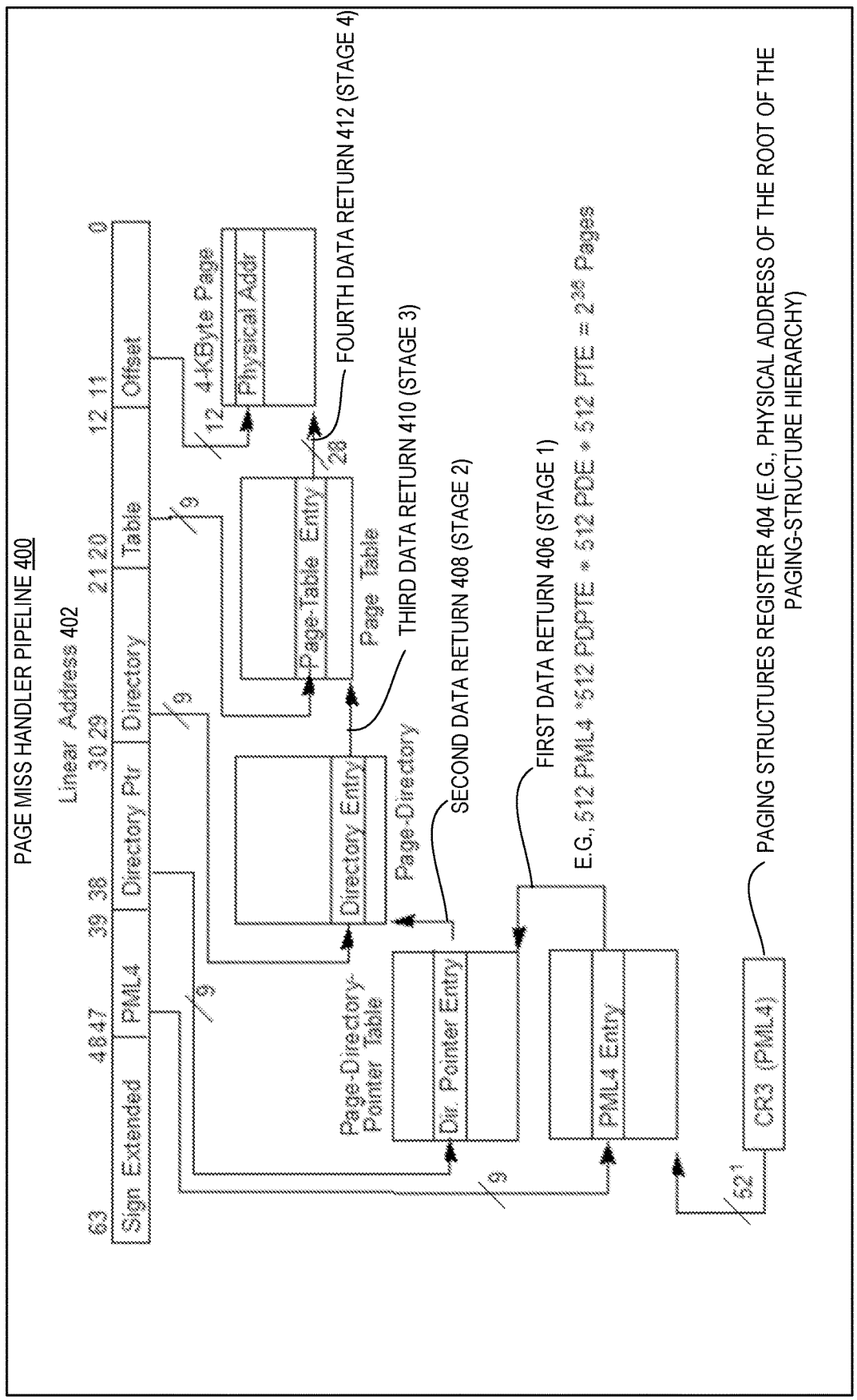
FIG. 4 illustrates a four-stage page miss handler pipeline according to embodiments of the disclosure.
Figure 5:
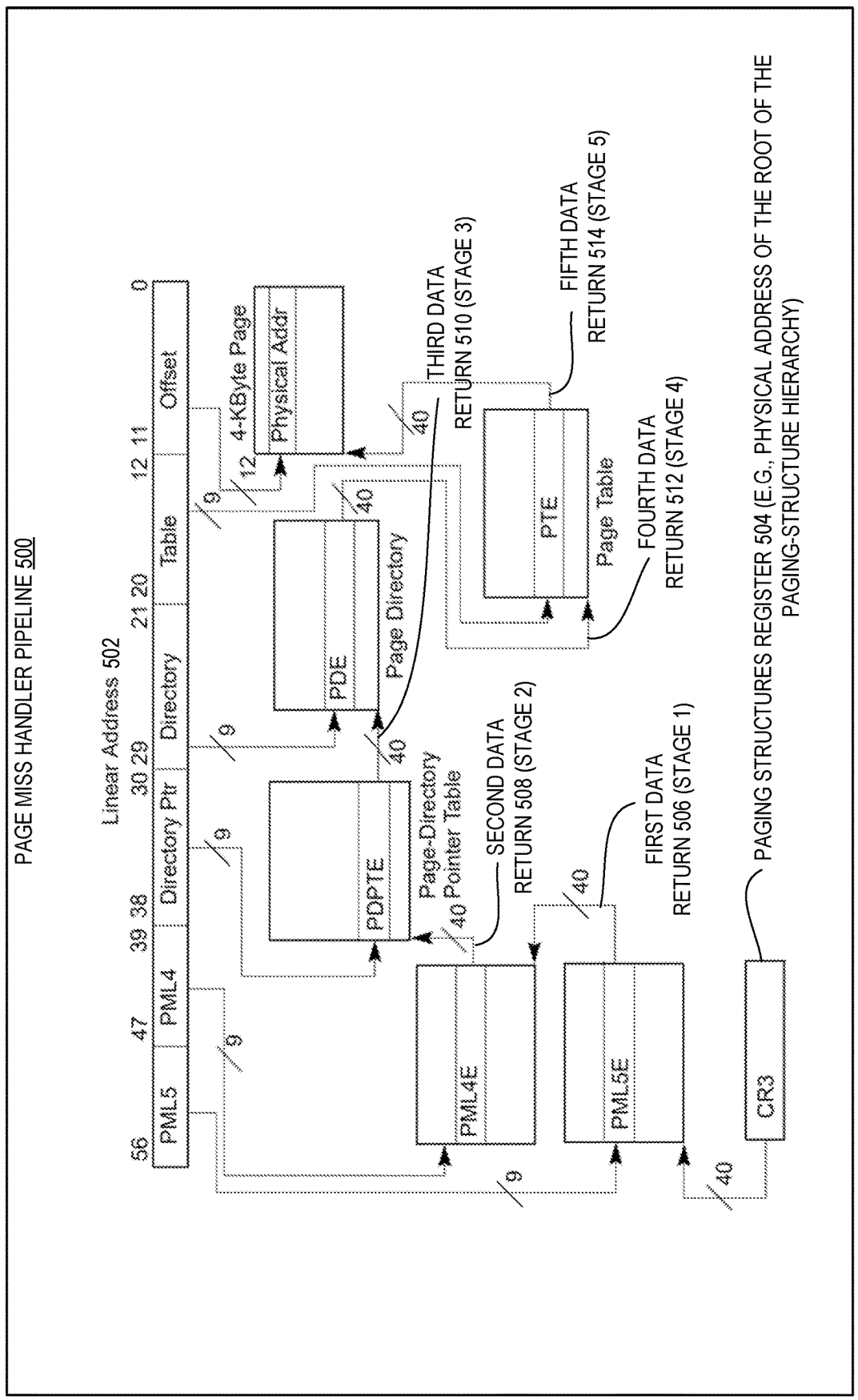
FIG. 5 illustrates a five-stage page miss handler pipeline according to embodiments of the disclosure.

Following FIGS. 4 and 5 illustrate examples of four-stage (e.g., level) and five-stage (e.g., level) page miss handler pipelines, respectively. It should be understood that any single or plurality of levels (e.g., 3, 4, 5, 6, 7, etc.) of page miss handler may be utilized.

FIG. 4 illustrates a four-stage (e.g., level) page miss handler pipeline 400 according to embodiments of the disclosure. In certain embodiments, each stage is capable of operating independently of other stages, e.g., such that proper subset of a page walk (e.g., for a single level) can be performed on each stage for different linear addresses. The numbers utilized herein are an example and other numbers may be utilized.

Page miss handler pipeline 400 includes an input of a linear address 402 and a value (e.g., a PML4 value) from a paging (e.g., control) structure register 404 to first stage of page miss handler pipeline 400. In one embodiment, all paging structures comprise 512 8-byte (64-bit) entries.

In the depicted embodiment, CR3 contains the physical address of the PML4 table, and an entry in the PML4 table is selected by bits (e.g., 47:39) of the linear address. For example, with this PML4 entry is used for all (e.g., linear) addresses in a 512-GByte region of linear addresses with the same value in bits 47:39. In the depicted embodiment, the selected PML4 entry contains the physical address of a page-directory-pointer table and is output from the first stage as first data return 406.

In the depicted embodiment, a page-directory-pointer table entry (PDP) is selected by bits (e.g., 38:30) of the linear address. For example, with this PDP used for all linear addresses in the 1-GByte region of linear addresses with the same value in bits 47:30. In the depicted embodiment, the selected PDP contains the physical address of a page directory table and is output from the second stage as second data return 408.

In the depicted embodiment, a page-directory entry (PDE) is selected by bits (e.g., 29:21) of the linear address. For example, with this PDE used for all linear addresses in the 2-MByte region of linear addresses with the same value in bits 47:21. In the depicted embodiment, the selected PDE contains the physical address of a page table and is output from the third stage as third data return 410.

In the depicted embodiment, a page-table entry (PTE) is selected by bits (e.g., 20:12) of the linear address. For example, with this PTE used for all linear addresses in the 4-KByte region of linear addresses with the same value in bits 47:12. In the depicted embodiment, the selected PTE contains the physical address of the page frame referenced by the linear address and is output from the fourth stage as fourth data return 412. In certain embodiments, the offset of the access within the page frame is the value of bits (e.g., 11:0) of the linear address.

In certain embodiments, in addition to a physical address, each entry in a paging structure contains bits that control the translation process and how linear addresses may be used. These bits may include the following:

Present (e.g., bit 0): If this bit is 0 in any paging-structure entry used to translate a linear address, address translation stops and a page fault is generated. The physical address in the paging-structure entry is not used to access another paging structure.

Read/write (bit 1): A linear address may be used by user software (e.g., CPL=3) to write to memory only if this bit is 1 in all paging-structure entries (e.g., PML4, PDP, etc.) used to translate the linear address to a physical address. If the bit is 0 in any of those entries, an attempt by user software to write to memory using the linear address causes a page fault.

User/supervisor (e.g., bit 2): A linear address may be used by user software to access memory only if this bit is 1 in all paging-structure entries used to translate the linear address to a physical address. If the bit is 0 in any of those entries, an attempt by user software to access memory using the linear address causes a page fault.

Accessed (e.g., bit 5: When a linear address is used to access memory, the processor sets this bit to 1 in all paging-structure entries used to translate the linear address to a physical address.

Dirty (e.g., bit 6): When a linear address is used to write to memory, the processor sets this bit to 1 in the PTE used to translate the linear address to a physical address. This bit is not used in the entries of paging structures other than page tables; the processor ignores it.

Reserved bits: If any of these bits are 1 in any paging-structure entry used to translate a linear address, address translation stops and a page fault is generated. The physical address in the paging-structure entry is not used to access another paging structure.

Execute-disable (e.g., bit 63): A linear address may be used to fetch instructions from memory only if this bit is 0 in all paging-structure entries used to translate the linear address to a physical address. If the bit is 1 in any of those entries, an attempt to fetch instructions from memory using the linear address causes a page fault.

In certain embodiments, prefetches and memory accesses that are a result of speculative execution do not cause page faults, for example, if such an access encounters one of the faulting conditions identified above, it is aborted.

FIG. 5 illustrates a five-stage page miss handler pipeline 500 according to embodiments of the disclosure. In certain embodiments, each stage is capable of operating independently of other stages, e.g., such that proper subset of a page walk (e.g., for a single level) can be performed on each stage for different linear addresses. The numbers utilized herein are an example and other numbers may be utilized.

Page miss handler pipeline 500 includes an input of a linear address 502 and a value (e.g., a PML5 value) from a paging (e.g., control) structure register 504 to first stage of page miss handler pipeline 400. In one embodiment, all paging structures comprise 512 8-byte (64-bit) entries.

In certain embodiments, a (e.g., logical) processor uses 5-level paging if IA32_EFER.LMA=1 and CR4.LA57=1. Like certain embodiments of 4-level paging, certain embodiments of 5-level paging translate linear addresses using a hierarchy of stored paging structures. For example, where 5-level paging increases the linear-address width to 57 bits (from an embodiment with 48 bits supported by 4-level paging), 5-level paging allows up to 128 PBytes of linear-address space to be accessed at any given time. Also like 4-level paging, 5-level paging uses CR3 to locate the first paging-structure in the hierarchy.

In certain embodiments, a page walk begins by identifying a 4-KByte naturally aligned PML5 table. In one embodiment, it is located at the physical address specified in bits (e.g., 51:12) of CR3. In one embodiment, a PML5 table includes 512 64-bit entries (PML5Es).

In the depicted embodiment, a PML5E table is selected using the physical address, e.g., with bits 51:12 from (e.g., CR3) paging structure register 504, bits 11:3 are bits 56:48 of the linear address, and bits 2:0 are all 0. Because a PML5E is identified using bits 56:48 of the linear address, it controls access to a 256-TByte region of the linear-address space In certain embodiments, the next step of the translation process identifies a (e.g., 4-KByte naturally aligned) PML4 table. In the depicted embodiment, PML4 table is located at the physical address specified by: bits 51:12 of the PML5E, bits 11:3 are bits 47:39 of the linear address, and bits 2:0 are all 0. In the depicted embodiment, the physical address for the PML4E table is determined from the PML5E table and is output from the first stage as first data return 506.

In one embodiment when accessing a paging-structure entry, the memory type used to access the PML4E table is based in part on page-level cache disable (PCD) and page-level write through (PWT) bits in the PML5E table. For example, where a PML4E table is identified using bits 56:39 of the linear address, it controls access to a 512-GByte region of the linear-address space. In the depicted embodiment, the selected PML4 entry contains the physical address of a page-directory-pointer table and is output from the second stage as second data return 508.

In the depicted embodiment, a page-directory-pointer table entry (PDP) is selected by bits (e.g., 38:30) of the linear address. For example, with this PDP used for all linear addresses in the 1-GByte region of linear addresses with the same value in bits 47:30. In the depicted embodiment, the selected PDP contains the physical address of a page directory table and is output from the third stage as third data return 510.

In the depicted embodiment, a page-directory entry (PDE) is selected by bits (e.g., 29:21) of the linear address. For example, with this PDE used for all linear addresses in the 2-MByte region of linear addresses with the same value in bits 47:21. In the depicted embodiment, the selected PDE contains the physical address of a page table and is output from the fourth stage as fourth data return 512.

In the depicted embodiment, a page-table entry (PTE) is selected by bits (e.g., 20:12) of the linear address. For example, with this PTE used for all linear addresses in the 4-KByte region of linear addresses with the same value in bits 47:12. In the depicted embodiment, the selected PTE contains the physical address of the page frame referenced by the linear address and is output from the fifth stage as fifth data return 514. In certain embodiments, the offset of the access within the page frame is the value of bits (e.g., 11:0) of the linear address.

In certain embodiments, in addition to a physical address, each entry in a paging structure contains bits that control the translation process and how linear addresses may be used. In certain embodiments, the values of bit 1, bit 2, and bit 63 of the PML5E may be used (in combination with the corresponding bits in other paging-structure entries) to determine access rights. In certain embodiments, an accessed flag (e.g., bit 5) in the PML5E table is updated, for example, as is done for other paging-structure entries.

FIG. 6 illustrates example page walk and data access stages 600 for a pipelined page miss handler according to embodiments of the disclosure. The underlined stage names may indicate an access to a data storage pipeline (e.g., and the non-underlined stage names indicating an access to a page miss handler pipeline). Stage 602 indicates a TLB miss (e.g., with a corresponding entry loaded into PMH queue). Stage 604 includes entry into a PMH pipeline (e.g., first stage) and checking of various caches (e.g., PDx caches, such as, but not limited to, the PDP and PDE caches discussed above). Stage 606 includes checking the content of those various caches, e.g., for relevant data. Stage 608 includes requesting a data storage pipeline (e.g., data cache unit) and/or checking for cumulative faults. Stage 610 includes checking for terminal faults. Stage 612 indicates an update of queue entries and/or fault information, followed by a change of the current state at 626. Stage 614 indicates a staging of a request for a data storage pipeline. Stage 616 indicates a read of a data cache tag (DCTAG) for the request. Stage 618 indicates a read of the data (DCDATA) for the request (e.g., a hit for the data in the (e.g., L1) data cache). Stage 620 indicates a return of the data for the request (e.g., to page miss handler circuit and/or TLB) followed by an update of the PMH queue entry (e.g., with the returned data) at 628. Stage 622 indicates a next request for the PMH pipeline. Stage 624 indicates staging and/or a write of the various (e.g., PDx) caches.

Figure 7:
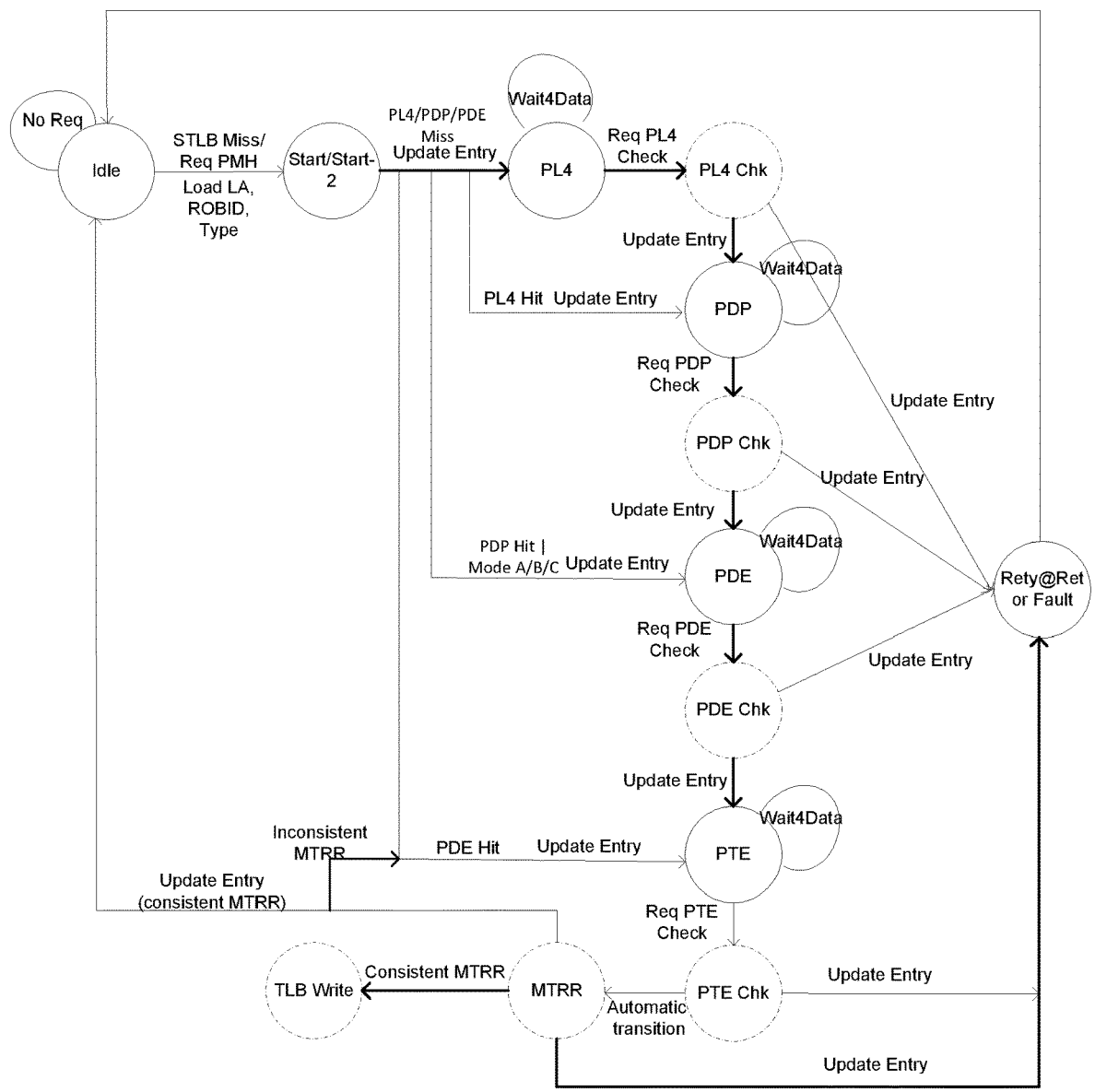
FIG. 7 illustrates an example state machine for a pipelined page miss handler according to embodiments of the disclosure.

FIG. 7 illustrates an example state machine 700 for a pipelined page miss handler (e.g., page miss handler circuit 104 in FIG. 1) according to embodiments of the disclosure. In certain embodiments, a page miss handler circuit 104 includes logic circuitry that implements state machine 700, e.g., with each circle being a single state. The depicted stage machine corresponds to a four-level (e.g., four-stage) page miss handler pipeline, but other numbers of level(s) may be utilized accordingly.

In certain embodiments, upon a TLB miss (e.g., either no entry for that virtual address in the TLB or the entry in the TLB is not marked as valid (i.e., being invalid)), an entry is loaded and the state changes from IDLE to START, and the PMH is requested to determine the next PMH state. FIG. 7 shows possible transitions based on caching hits or misses. In certain embodiments, the PMH will return the next state to the entry with the address of the next level of the walk. In certain embodiments, the queue entry will then request access to the data storage pipeline (e.g., data cache unit (DCU)) pipeline to retrieve the data. In certain embodiments, this request will arbitrate for load ports based on the load scheduler of the data storage pipeline. After winning arbitration for the data storage pipeline, the queue entry will wait for data (e.g., from the cache hierarchy or the system memory (e.g., DRAM)) in certain embodiments. Upon data valid, the queue will request the PMH to check that data (shown as "Chk" states) in certain embodiments.

In one embodiment, for walks that have inconsistent memory type range register information which requires shrinking the page from large page to small page, the queue entry that was in the PTE state will re-request access to the PTE check state with the indicator that it had inconsistent value in a memory type range register (MTRR). TLB may be a unified TLB or a first level cache's TLB.

FIG. 8 illustrates a flow diagram 800 for pipelined page miss handling according to embodiments of the disclosure. Depicted flow 800 includes translating virtual addresses to physical addresses with a translation lookaside buffer of a system at 802, performing a first page walk within a first stage of a plurality of pipelined page walk stages of a single page miss handler circuit of the system for a first miss of a first virtual address in the translation lookaside buffer at 804, and contemporaneously performing a second page walk within a second stage of the plurality of pipelined page walk stages of the single page miss handler circuit for a second miss of a second virtual address in the translation lookaside buffer at 806.

In certain embodiments, a page miss handler (e.g., for an entry in the PMH queue) can do walks speculatively, so events such as branch miss predicts (e.g., JECLEAR) or pipeline flushes (e.g., ROCLEAR) are managed as well. In one embodiment, a queue entry has the retire pointer of the original access, and thus (i) for JECLEAR cases, operations younger than the branch are flushed while operations older than the branch continue (the retire pointer is used to determine age, such that queue entries that are younger can go back to IDLE while entries that are older will continue, and for those entries that have outstanding transactions, those transaction are "orphaned" and will just write into the data cache) and (i) for ROCLEAR, all valid entries are returned to IDLE.

For walks that cause access bit updates (A-bit) or dirty bit updates (D-bit) (or are non-cacheable) certain embodiments herein include the ability to tell the operation that loaded the queue to retry the walk when the operation is at retirement. This allows the operation to be flushed without having an "orphaned" locked access or non-cacheable access outstanding.

Exemplary architectures, systems, etc. that the above may be used in are detailed below.

At least some embodiments of the disclosed technologies can be described in view of the following examples:

Example 1. An apparatus comprising:
a translation lookaside buffer to translate virtual addresses to physical addresses; and
a single page miss handler circuit comprising a plurality of pipelined page walk stages, wherein the single page miss handler circuit is to contemporaneously perform a first page walk within a first stage of the plurality of pipelined page walk stages for a first miss of a first virtual address in the translation lookaside buffer, and a second page walk within a second stage of the plurality of pipelined page walk stages for a second miss of a second virtual address in the translation lookaside buffer.

Example 2. The apparatus of example 1, wherein an output of the first stage is an address for a paging structure used by the second stage for the first virtual address, and the second stage is an immediately next stage from the first stage.

Example 3. The apparatus of example 2, wherein an output of the second stage is a physical address for the second virtual address.

Example 4. The apparatus of example 2, wherein the single page miss handler circuit causes the address for the paging structure to be read from another paging structure stored in a data storage pipeline coupled to the single page miss handler circuit.

Example 5. The apparatus of example 1, wherein the single page miss handler circuit is to contemporaneously perform a third page walk within a third stage of the plurality of pipelined page walk stages for a third miss of a third virtual address in the translation lookaside buffer, the first page walk within the first stage of the plurality of pipelined page walk stages for the first miss of the first virtual address, and the second page walk within the second stage of the plurality of pipelined page walk stages for the second miss of the second virtual address.

Example 6. The apparatus of example 5, wherein an output of the second stage is an address for a page table for the second virtual address, and an output of the third stage is a physical address for the third virtual address.

Example 7. The apparatus of example 1, wherein the single page miss handler circuit is to contemporaneously cause an address for a paging structure for a third miss of a third virtual address to be read from another paging structure stored in storage coupled to the single page miss handler circuit, the first page walk within the first stage of the plurality of pipelined page walk stages for the first miss of the first virtual address, and the second page walk within the second stage of the plurality of pipelined page walk stages for the second miss of the second virtual address.

Example 8. The apparatus of example 1, wherein a first data request that causes the first miss is before a second data request that causes the second miss in program order.

Example 9. A method comprising:
translating virtual addresses to physical addresses with a translation lookaside buffer of a system;
performing a first page walk within a first stage of a plurality of pipelined page walk stages of a single page miss handler circuit of the system for a first miss of a first virtual address in the translation lookaside buffer; and
contemporaneously performing a second page walk within a second stage of the plurality of pipelined page walk stages of the single page miss handler circuit for a second miss of a second virtual address in the translation lookaside buffer.

Example 10. The method of example 9, wherein an output of the first stage is an address for a paging structure used by the second stage for the first virtual address, and the second stage is an immediately next stage from the first stage.

Example 11. The method of example 10, wherein an output of the second stage is a physical address for the second virtual address.

Example 12. The method of example 10, further comprising reading the address for the paging structure from another paging structure stored in a data storage pipeline coupled to the single page miss handler circuit.

Example 13. The method of example 9, further comprising contemporaneously performing a third page walk within a third stage of the plurality of pipelined page walk stages for a third miss of a third virtual address in the translation lookaside buffer, the first page walk within the first stage of the plurality of pipelined page walk stages for the first miss of the first virtual address, and the second page walk within the second stage of the plurality of pipelined page walk stages for the second miss of the second virtual address.

Example 14. The method of example 13, wherein an output of the second stage is an address for a page table for the second virtual address, and an output of the third stage is a physical address for the third virtual address.

Example 15. The method of example 9, further comprising contemporaneously reading an address for a paging structure for a third miss of a third virtual address from another paging structure stored in storage coupled to the single page miss handler circuit, with the performing of the first page walk within the first stage of the plurality of pipelined page walk stages for the first miss of the first virtual address, and the performing of the second page walk within the second stage of the plurality of pipelined page walk stages for the second miss of the second virtual address.

Example 16. The method of example 9, wherein a first data request that causes the first miss is before a second data request that causes the second miss in program order.

Example 17. A hardware processor core comprising:
an execution circuit to generate virtual addresses for data storage requests;
a translation lookaside buffer to translate the virtual addresses to physical addresses; and
a single page miss handler circuit comprising a plurality of pipelined page walk stages, wherein the single page miss handler circuit is to contemporaneously perform a first page walk within a first stage of the plurality of pipelined page walk stages for a first miss of a first virtual address in the translation lookaside buffer, and a second page walk within a second stage of the plurality of pipelined page walk stages for a second miss of a second virtual address in the translation lookaside buffer.

Example 18. The hardware processor core of example 17, wherein an output of the first stage is an address for a paging structure used by the second stage for the first virtual address, and the second stage is an immediately next stage from the first stage.

Example 19. The hardware processor core of example 18, wherein an output of the second stage is a physical address for the second virtual address.

Example 20. The hardware processor core of example 18, wherein the single page miss handler circuit causes the address for the paging structure to be read from another paging structure stored in a data storage pipeline coupled to the single page miss handler circuit.

Example 21. The hardware processor core of example 17, wherein the single page miss handler circuit is to contemporaneously perform a third page walk within a third stage of the plurality of pipelined page walk stages for a third miss of a third virtual address in the translation lookaside buffer, the first page walk within the first stage of the plurality of pipelined page walk stages for the first miss of the first virtual address, and the second page walk within the second stage of the plurality of pipelined page walk stages for the second miss of the second virtual address.

Example 22. The hardware processor core of example 21, wherein an output of the second stage is an address for a page table for the second virtual address, and an output of the third stage is a physical address for the third virtual address.

Example 23. The hardware processor core of example 17, wherein the single page miss handler circuit is to contemporaneously cause an address for a paging structure for a third miss of a third virtual address to be read from another paging structure stored in a data cache of the hardware processor core, the first page walk within the first stage of the plurality of pipelined page walk stages for the first miss of the first virtual address, and the second page walk within the second stage of the plurality of pipelined page walk stages for the second miss of the second virtual address.

Example 24. The hardware processor core of example 17, wherein a first data request that causes the first miss is before a second data request that causes the second miss in program order.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

Figure 9A:
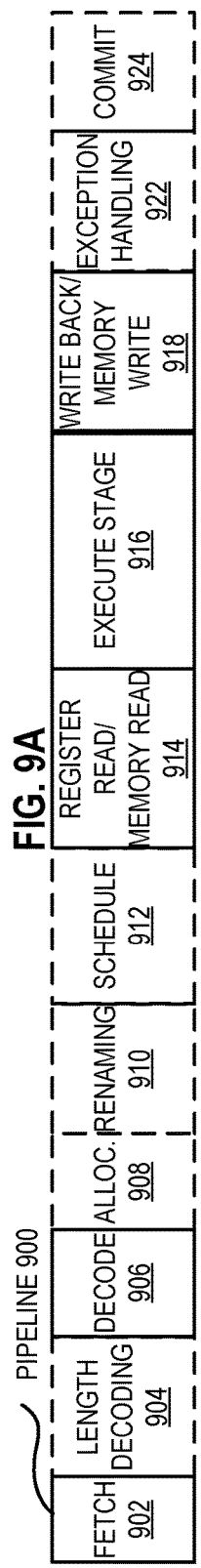
FIG. 9A is a block diagram illustrating both an exemplary in-order pipeline and an exemplary register renaming, out-of-order issue/execution pipeline according to embodiments of the disclosure.
Figure 9B:
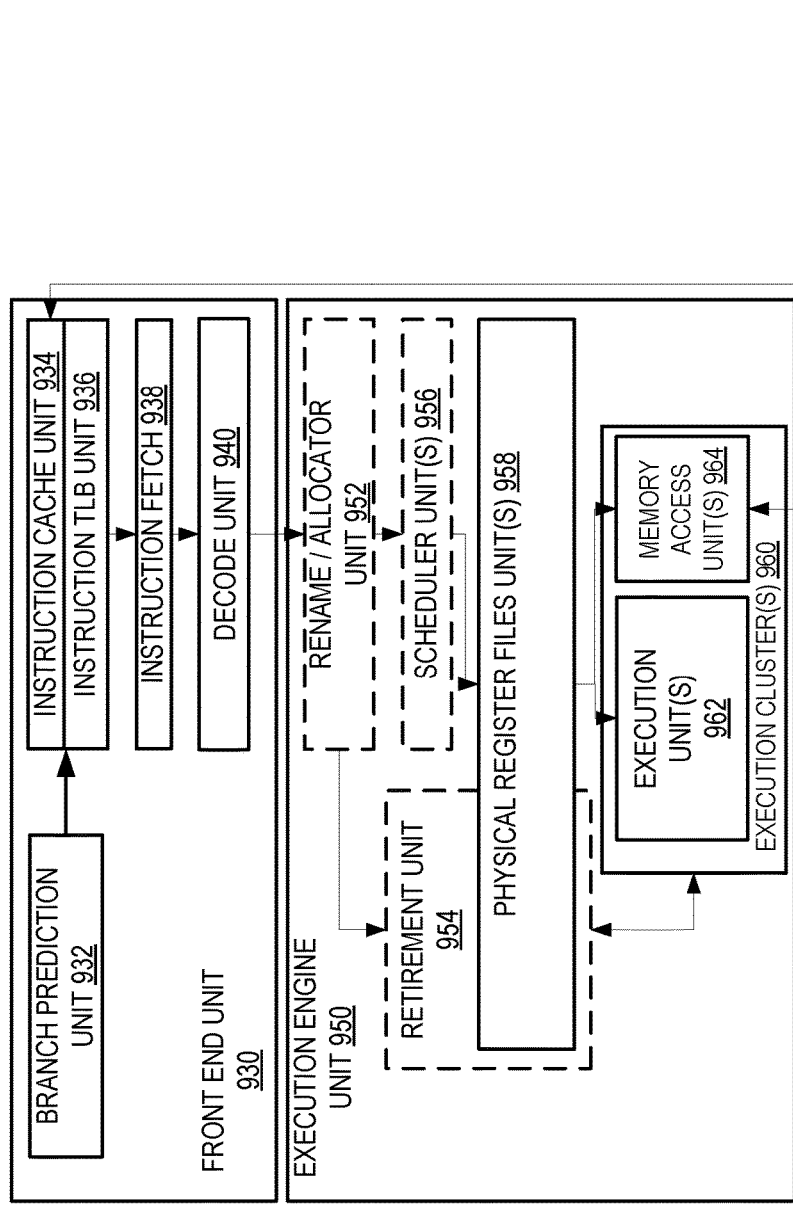
FIG. 9B is a block diagram illustrating both an exemplary embodiment of an in-order architecture core and an exemplary register renaming, out-of-order issue/execution architecture core to be included in a processor according to embodiments of the disclosure.

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory 980.

In certain embodiments, a page miss handler circuit 978 (e.g., according to the disclosure herein) is included to perform page walks, e.g., in cache units and/or memory 980.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, contemporaneous multithreading (where a single physical core provides a logical core for each of the threads that physical core is contemporaneously multithreading), or a combination thereof (e.g., time sliced fetching and decoding and contemporaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
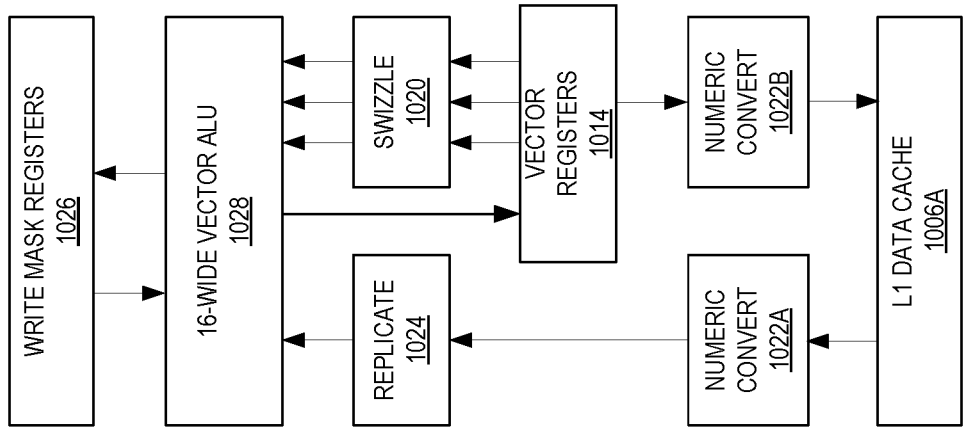
FIG. 10B is an expanded view of part of the processor core in FIG. 10A according to embodiments of the disclosure.
Figure 10A:
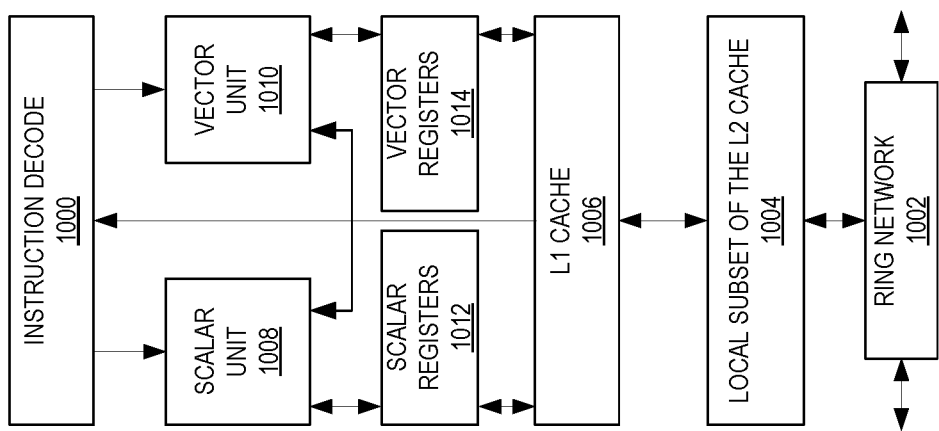
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
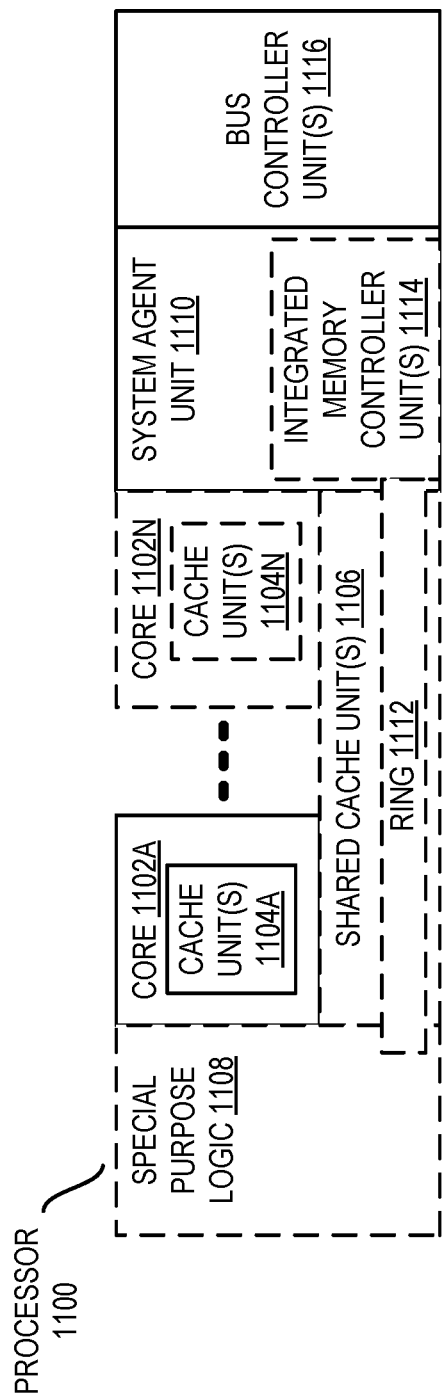
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
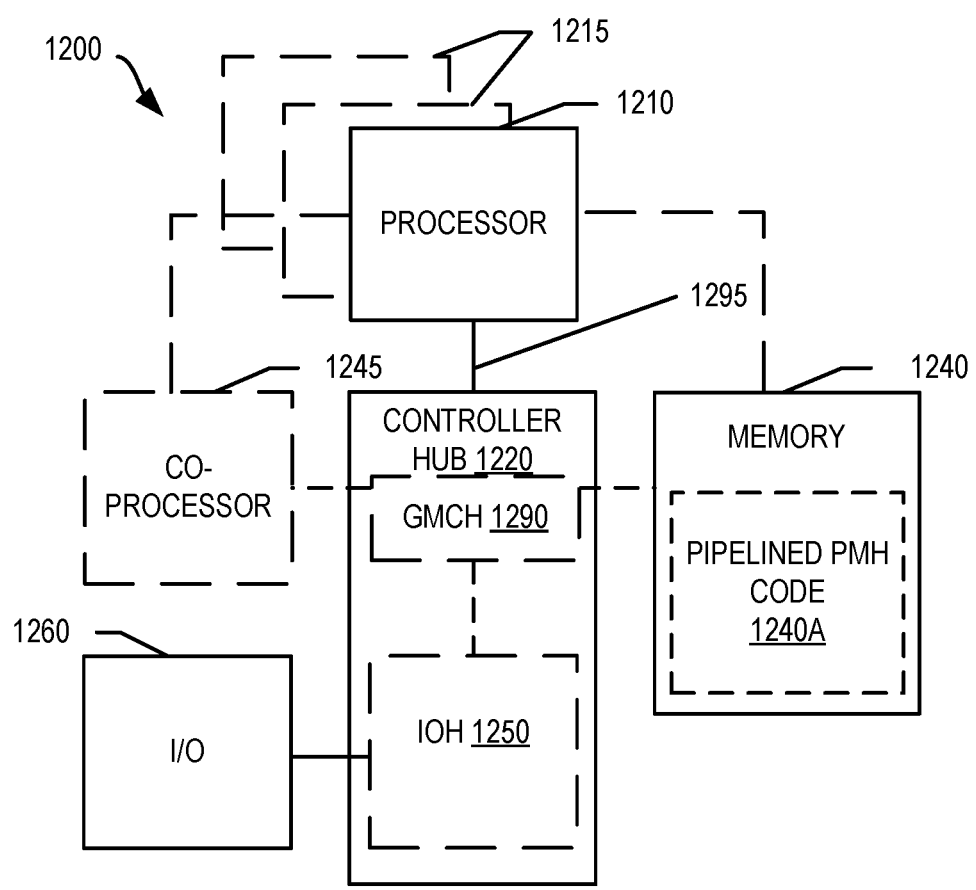
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include pipeline page miss handler (PMH) code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
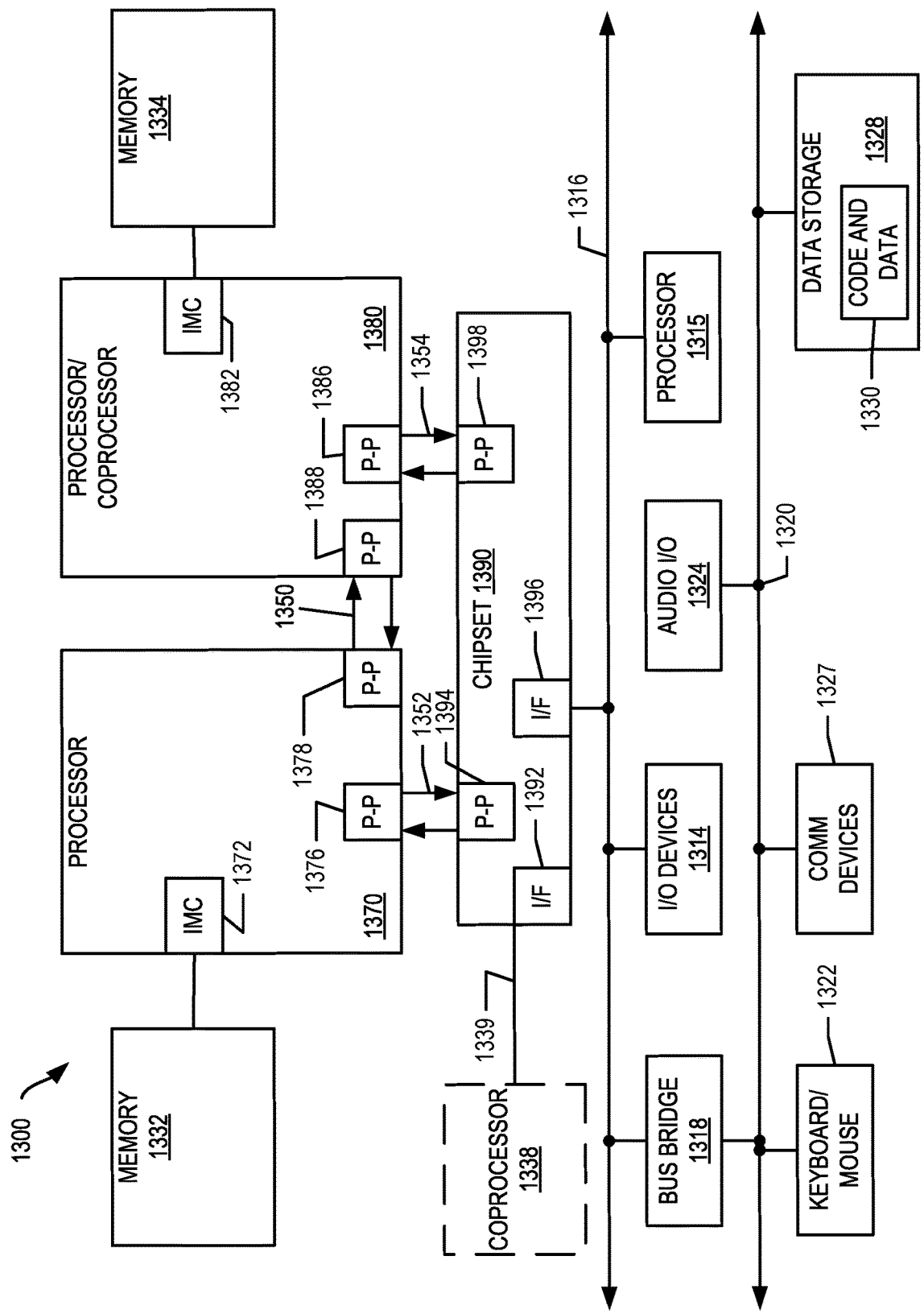
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
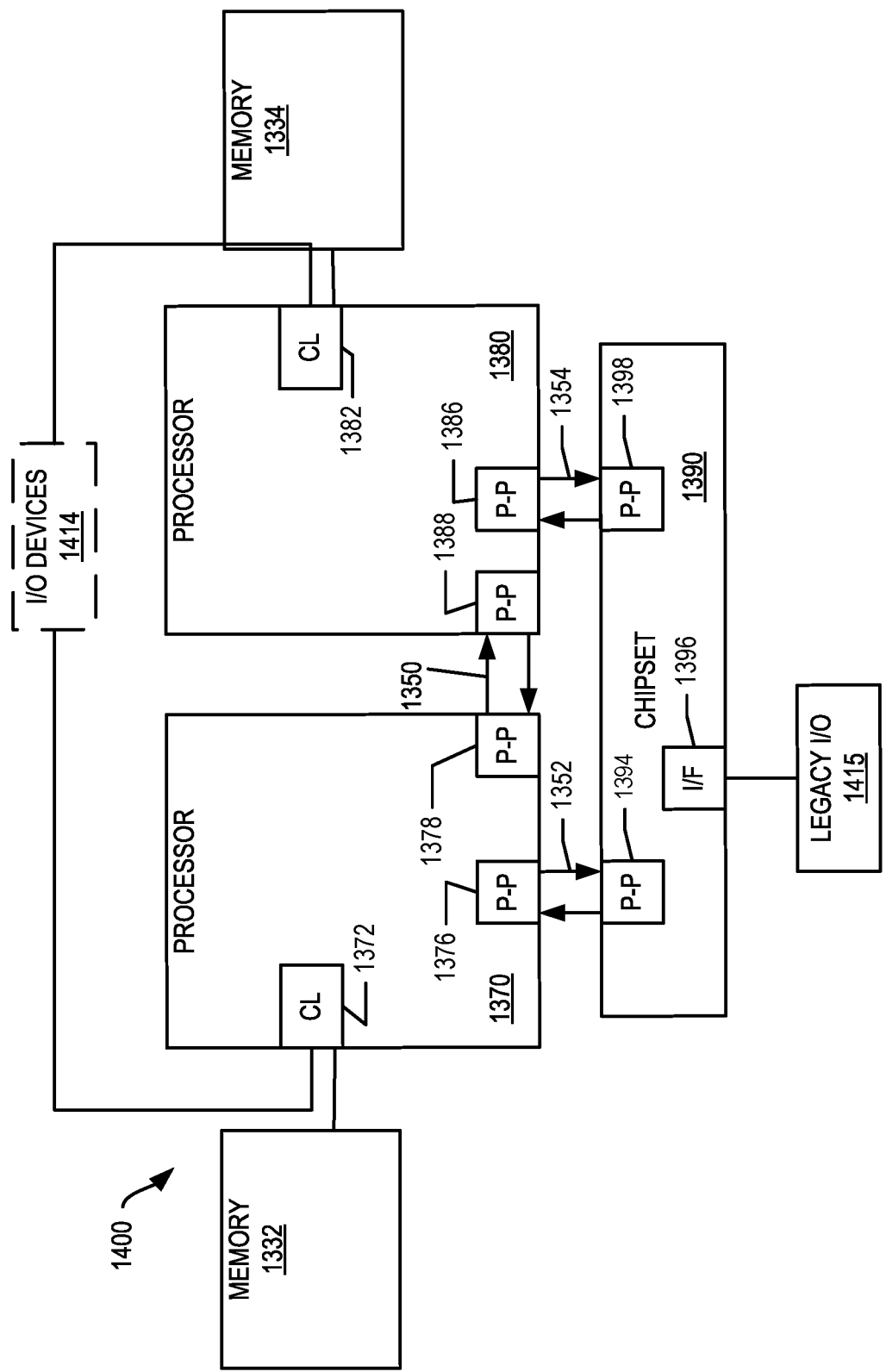
FIG. 14 is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
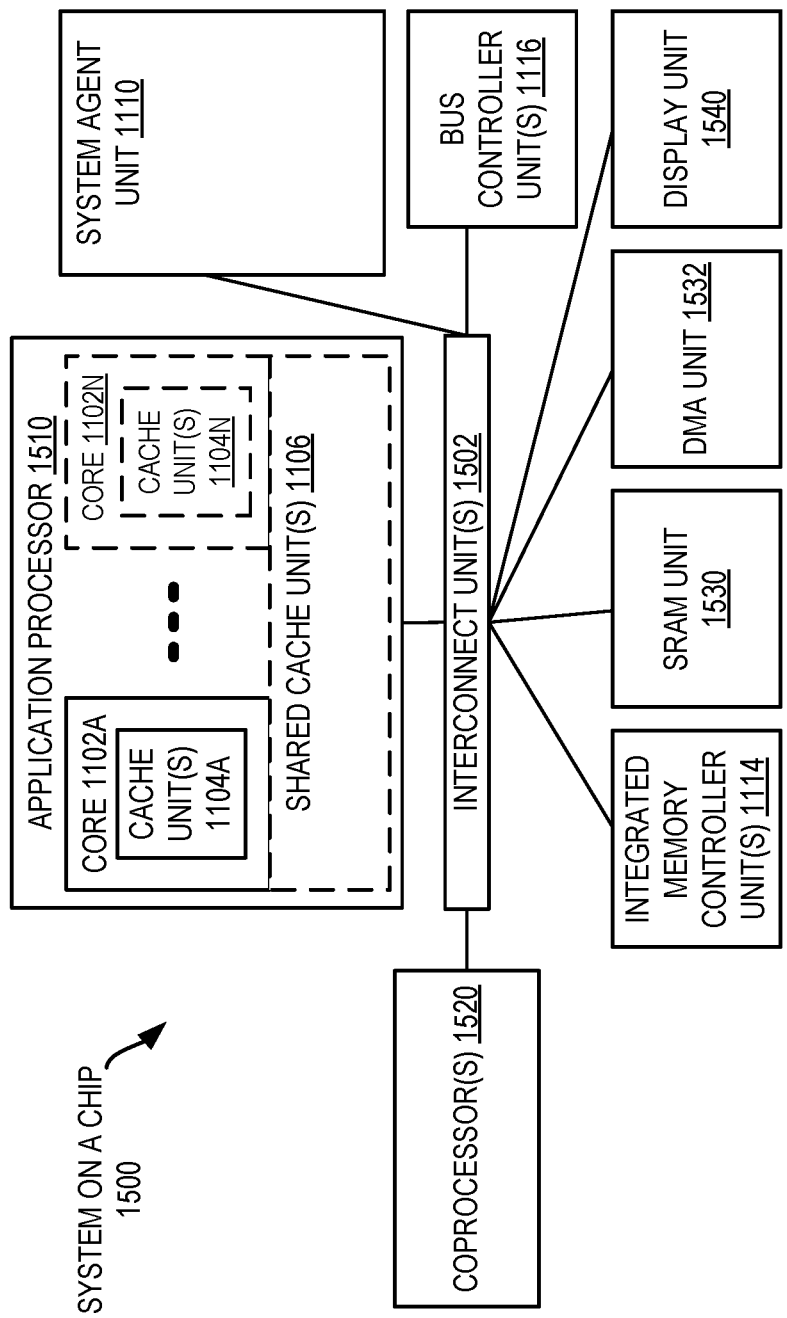
FIG. 15 is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
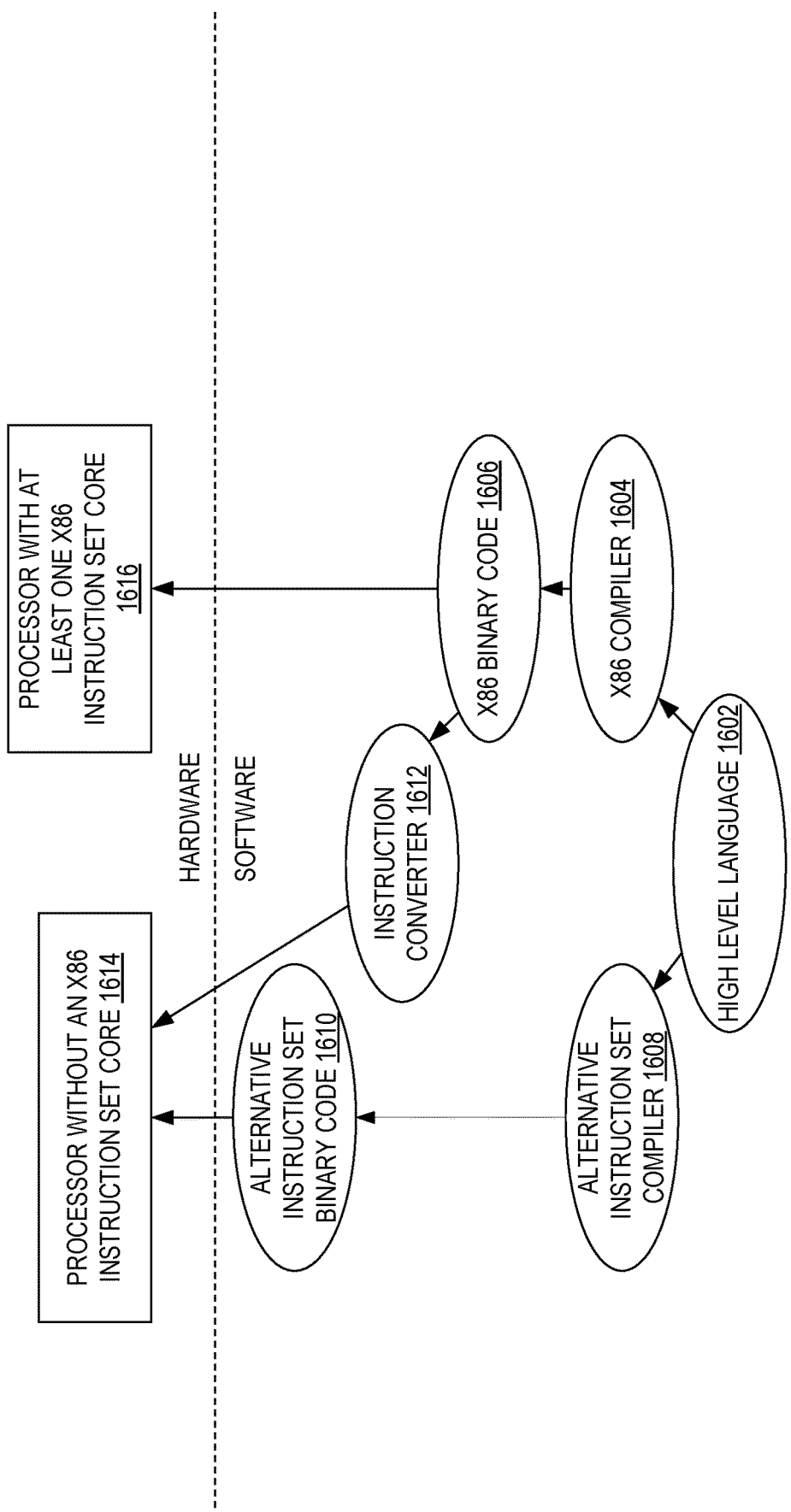
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
   a translation lookaside buffer to translate virtual addresses to physical addresses; and
   a single instance of hardware comprising a plurality of pipelined page walk stages that allow for a plurality of contemporaneous page walks to be performed for corresponding misses in the translation lookaside buffer without replication of the hardware a number of times equal to the plurality of contemporaneous page walks.

2. The apparatus of claim 1, wherein the single instance of the hardware comprises logic circuitry that implements a state machine for the plurality of contemporaneous page walks.

3. The apparatus of claim 2, wherein the state machine includes a corresponding state for each stage of the plurality of pipelined page walk stages.

4. The apparatus of claim 2, wherein each state of a plurality of possible states of the state machine is independent of any other state of the plurality of possible states of the state machine.

5. The apparatus of claim 4, wherein the single instance of the hardware is to have a current state of a first page walk of the plurality of contemporaneous page walks in a same non-idle state as a current state of a second page walk of the plurality of contemporaneous page walks.

6. The apparatus of claim 4, wherein the single instance of the hardware is to have a current state of a first page walk of the plurality of contemporaneous page walks in a different non-idle state than a current state of a second page walk of the plurality of contemporaneous page walks.

7. The apparatus of claim 1, wherein the single instance of the hardware is to generate, from at least a fourth stage of the plurality of pipelined page walk stages, a physical address for a virtual address that missed in the translation lookaside buffer.

8. A method comprising:
   translating virtual addresses to physical addresses with a translation lookaside buffer of a system; and
   performing, by a single instance of hardware comprising a plurality of pipelined page walk stages of the system, a plurality of contemporaneous page walks for corresponding misses in the translation lookaside buffer without replication of the hardware a number of times equal to the plurality of contemporaneous page walks.

9. The method of claim 8, wherein the performing comprises tracking, via a state machine, a current state of a plurality of possible states for each page walk of the plurality of contemporaneous page walks.

10. The method of claim 9, wherein the state machine includes a corresponding state for each stage of the plurality of pipelined page walk stages.

11. The method of claim 9, wherein each state of a plurality of possible states of the state machine is independent of any other state of the plurality of possible states of the state machine.

12. The method of claim 11, wherein a current state of a first page walk of the plurality of contemporaneous page walks is a same non-idle state as a current state of a second page walk of the plurality of contemporaneous page walks.

13. The method of claim 11, wherein a current state of a first page walk of the plurality of contemporaneous page walks is a different non-idle state than a current state of a second page walk of the plurality of contemporaneous page walks.

14. The method of claim 8, wherein the performing comprises generating, by the single instance of the hardware from at least a fourth stage of the plurality of pipelined page walk stages, a physical address for a virtual address that missed in the translation lookaside buffer.

15. A hardware processor core comprising:
    an execution circuit to generate data storage requests for virtual addresses;
    a translation lookaside buffer to translate a virtual address to a physical address; and
    a single instance of hardware comprising a plurality of pipelined page walk stages that allow for a plurality of contemporaneous page walks to be performed for corresponding misses in the translation lookaside buffer without replication of the hardware a number of times equal to the plurality of contemporaneous page walks.

16. The hardware processor core of claim 15, wherein the single instance of the hardware comprises logic circuitry that implements a state machine for the plurality of contemporaneous page walks.

17. The hardware processor core of claim 16, wherein the state machine includes a corresponding state for each stage of the plurality of pipelined page walk stages.

18. The hardware processor core of claim 16, wherein each state of a plurality of possible states of the state machine is independent of any other state of the plurality of possible states of the state machine.

19. The hardware processor core of claim 18, wherein the single instance of the hardware is to have a current state of a first page walk of the plurality of contemporaneous page walks in a same non-idle state as a current state of a second page walk of the plurality of contemporaneous page walks.

20. The hardware processor core of claim 18, wherein the single instance of the hardware is to have a current state of a first page walk of the plurality of contemporaneous page walks in a different non-idle state than a current state of a second page walk of the plurality of contemporaneous page walks.

* * * * *